Nov. 28, 1961        C. G. SNYDER        3,010,316
FLUID FLOW REGULATING AND INDICATING APPARATUS
Filed Dec. 16, 1957
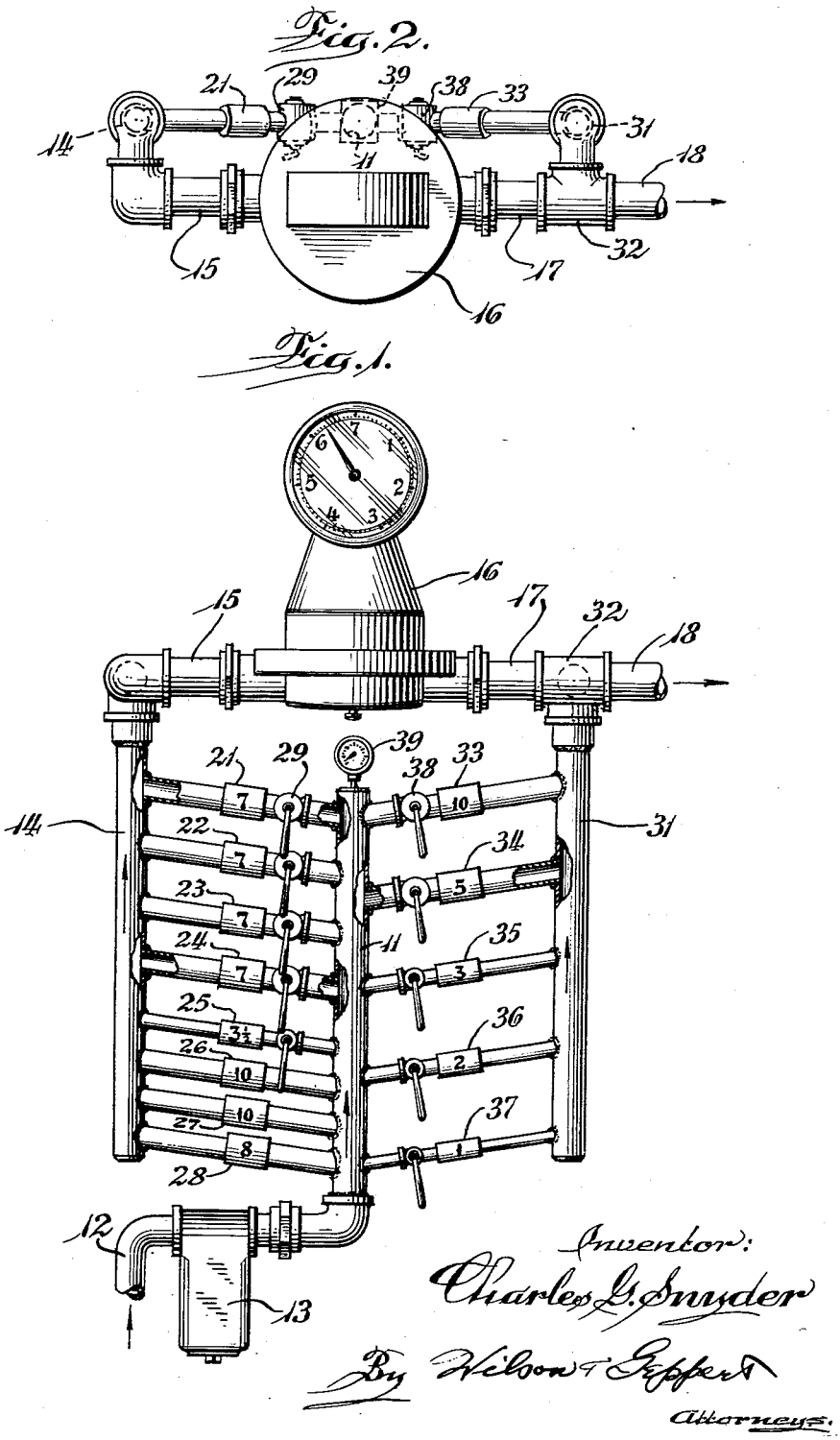

United States Patent Office 3,010,316
Patented Nov. 28, 1961

3,010,316
FLUID FLOW REGULATING AND
INDICATING APPARATUS
Charles G. Snyder, Lemont, Ill., assignor to Anning-Johnson Company, Chicago, Ill., a corporation of Illinois
Filed Dec. 16, 1957, Ser. No. 703,185
3 Claims. (Cl. 73—203)

This invention relates in general to an apparatus for regulating the flow of a liquid and indicating the flow rate of a predetermined portion of the total delivered, in order that a predetermined proportional mixture of the delivered liquid with a powdered or granular substance may be produced. More specifically, the invention is designed to enable the accurate proportioning of the constituents of a mixture of gypsum and water in the production of which the quantity of gypsum employed is manually regulated by the operator who opens and dumps the bags of gypsum into a mixer at timed intervals indicated by the water flow operated indicator embodied in my novel apparatus.

It is well known in the art that the amount of water in a mixture of gypsum and water commercially known as a slurry directly affects the strength of the ultimate product. Where the ultimate product is a roof deck, for instance, for the production of which my invention is particularly useful, the amount of water in the slurry directly affects the obtainable area coverage with maintenance of the required strength.

In the pouring of gypsum roof decks, the practice at present most frequently followed is to deliver water at a constant or substantially constant flow to a mixer in the form of an upright open top tub equipped with an internal agitator which has revolving blades or paddles of the general type exemplified by U.S. Patent No. 1,660,242. The bags of gypsum are delivered by workmen onto a shelf or table adjacent to the mixing tub where an operator slashes the bags and pours the contents successively into the mixer. The rate of delivery of the gypsum into the mixer is determined entirely by the skill of the operator who estimates by observation the fluidity or viscosity of the slurry being produced and governs his delivery of gypsum to the mixer according to his estimate of the requirements. The results insofar as the proportions of water and gypsum are concerned are dependent solely upon the skill, experience and reliability of the operator.

If the ratio of the amount of water to the amount of gypsum cement remained constant for all conditions, the problem of water control could be met by a water meter so calibrated that an indicator would make one revolution on the dial for each required bag of gypsum. In other words, the operator would dump a bag of gypsum into the mixing tub at each revolution of the indicator hand. The desired ratio of water to cement, however, varies with job conditions and with the consistency of the cement. One of the variations in job conditions, for instance, is the pitch of the roof deck. If a flat deck is being laid, the fluidity of the slurry may be greater, and consequently the amount of gypsum used may be less per unit of coverage than a sloping roof where a stiff and less fluid slurry would be required in order to prevent it from flowing too much before set occurs.

Furthermore, the gypsum employed varies in character and consistency from different sources and from different mills. It is, therefore, desirable for purposes of excellence of the product and for reasons of economy that the ratio of water to cement employed may be accurately regulated and controlled to meet the particular job conditions encountered and also to compensate for differences in composition and in consistency of various gypsums available.

The primary purpose of my present invention is to provide an apparatus capable of satisfactorily meeting the conditions and variations above indicated and without the necessity of employing complicated and expensive apparatus for proportioning the constituents of the slurry such as have been devised, patented, and to a limited extent used.

Another object of my invention is to provide an apparatus which will be simple in construction, economical to manufacture, install and use, and which when adjusted to meet the job and gypsum conditions in any particular instance will enable the production of a uniform product of the desired strength and consistency without dependence upon the skill or experience of the operator, who with the aid of my invention is required only to watch the indicator and dump one bag of cement into the mixer for each revolution of the indicator hand. Variations in the proportions of the constituents of the slurry and in the rate at which the slurry is produced are not dependent upon the skill of the operator, but are taken care of by adjustment of my improved regulating appparatus.

While, as previously stated, the specific embodiment of my invention herein disclosed is particularly adapted for the production of a gypsum cement slurry, it should be understood that it is capable of other similar uses with all the attendant advantages inherent in the employment of the apparatus.

In order to facilitate an understanding of my invention, I have illustrated on the accompanying drawing an embodiment thereof which at present seems preferable, from an inspection of which when considered in connection with the following description the invention and its advantages should be appreciated.

Referring to the drawing,

FIGURE 1 is an elevation of an apparatus constructed in accordance with my invention;

FIG. 2 is a plan view thereof.

Referring to the drawing more in detail, reference character 11 indicates a header to which the water, the flow of which is regulated, is delivered from a supply pipe 12, preferably through a strainer or filter 13. A riser 14 spaced from the header 11 is connected by a pipe 15 with a meter or indicator 16 to which the water flows from the riser 14 and from which it flows through the connection 17 to the discharge pipe 18 leading to the mixer. A conventional perforated ring or other preferred means of distributing the water upon its discharge into the mixture is customarily connected to the discharge pipe 18.

The header 11 is connected with the riser 14 through a plurality of branch pipes in which are installed respectively the flow controls or orifices 21, 22, 23, 24, 25, 26, 27, and 28. Forwardly of the flow controls or orifices 21 to 25, inclusive, the respective branch pipes are equipped with identical shut-off valves to an illustrative one of which reference character 29 is applied.

The flow controls or orifices are all similar in construction but of varying capacities, each being designed to deliver a predetermined number of gallons of water per minute. The capacity of each is designated on the drawing by a number, that is, flow controls or orifices 21 to 24, inclusive, each have a flow capacity of seven gallons, flow control or orifice 25 has a capacity of three and one-half gallons, flow controls or orifices 26 and 27 each have a capacity of ten gallons, and flow control or orifice 28 has a capacity of eight gallons per minute.

On the opposite side of the header 11 from the riser 14 a second riser 31 is connected at its upper end by a T connection 32 into the discharge line 18. This riser 31 is connected to the header 11 by a plurality of branches similar to those interposed between the header and the riser 14, these branches being equipped respectively with flow controls or orifices designated 33, 34, 35, 36, and 37. These branches are likewise equipped with the shut-off valves of conventional form, an illustrative one of which is designated 38. These flow controls or orifices similar to the flow controls or orifices 21 to 28, inclusive, are also of different capacities indicated on the drawing by the figures applied thereto, from which it will be observed that flow control or orifice 33 has a capacity of ten gallons per minute, flow control or orifice 34 has a capacity of five gallons per minute, flow control or orifice 35 has a capacity of three gallons per minute, flow control or orifice 36 has a capacity of two gallons per minute, and flow control or orifice 37 has a capacity of one gallon per minute.

Since for reasons previously indicated the ratio of water to cement varies both with the consistency of the material and with job conditions, the employment of a meter or indicator alone will not suffice to give the necessary ratio control. Experience has shown that the minimum practical ratio of water to cement would be seven gallons of water per bag of cement. The meter or indicator 16 recommended and here disclosed is calibrated to seven gallons of water per revolution of the indicator hand. The operator, therefore, would dump one bag of cement into the mixer at each revolution of the indicator hand, thus producing a slurry consisting of seven gallons of water to one bag of cement. Since in commercial practice the delivery of four bags of cement and twenty-eight gallons of water per minute would constitute the practical minimum on any job, my apparatus here illustrated is designed to deliver through the meter a minimum of twenty-eight gallons, producing four revolutions per minute of the indicator hand and the resultant delivery of four bags of cement. The three lower branches connecting the header 11 with the riser 14 and equipped with flow controls or orifices 26, 27 and 28 are accordingly designed to deliver respectively ten, ten and eight gallons per minute. Since these branches are not provided with shut-off valves, assuming that all of the shut-off valves of the apparatus are closed, twenty-eight gallons of water per minute will be delivered by these branches through the meter and four bags of cement per minute will be dumped, as indicated by the meter hand.

Any desired increase in this minimum water delivery may be had by opening one or more of the shut-off valves 29 and, if all of these valves were opened, the flow of water through the meter would be fifty-nine and one-half gallons per minute. Such water delivery would produce eight and one-half revolutions of the indicator hand per minute and would require the delivery by the operator of eight and one-half bags of cement per minute into the mixer. Any desired volume of water and cement delivery between the minimum of twenty-eight gallons of water and four bags of cement to fifty-nine and one-half gallons of water and eight and one-half bags of cement per minute may be obtained by obvious manipulation and setting of the shut-off valves 29.

Should it be desirable to increase the fluidity of the slurry above the ratio of seven gallons of water to one bag of cement which results from the water delivered through the meter, such increase may be obtained by opening one or more of the shut-off valves 38 located in the branches connecting the header 11 with the riser 31. As previously explained, these branches are equipped with flow controls or orifices adapted to deliver respectively ten, five, three, two, and one gallon of water per minute, so that any desired increase in water delivery and increase in fluidity of the slurry may be attained without variation in the bags per minute of cement dumped, by obvious manipulation and combination of the valves 38. It will be apparent that water in addition to that delivered through the meter may be delivered to the mixer in additional amounts ranging from one to twenty-one gallons per minute, by proper manipulation of the valves 38. The header 11 is preferably equipped with a pressure gauge 39 from which the pressure of the incoming water may be observed.

As an exemplification of the operation of my novel apparatus, the following example may be considered as typical.

On a particular job the existing conditions require a feed rate of six and one-half bags of gypsum cement per minute. The conditions and the consistency of the cement indicate a water-cement ratio of nine gallons of water per bag of cement. The three lower branches without shut-off valves will pass through the flow controls or orifices 26, 27 and 28 ten, ten and eight gallons, respectively, or a total of twenty-eight gallons. In addition, flow controls or orifices 23, 24 and 25, when their respective shut-off valves 29 are opened, will pass seven, seven and three and one-half gallons, or a total of seventeen and one-half gallons per minute, making a gross total of forty-five and one-half gallons per minute passing through the meter, which will operate the indicator at six and one-half revolutions per minute, pursuant to which the operator will deliver to the mixer six and one-half bags of cement. The slurry produced by such operation alone would consist of a water to cement ratio of seven gallons of water to one bag of cement.

The job requirements, however, are for nine instead of seven gallons of water per bag of cement, consequently, an additional two gallons of water per bag or thirteen gallons per minute must be supplied. This additional water is obtained through the branches connecting the header 11 with the riser 31 and does not pass through the meter. To attain this result, the valve 38 in the branch equipped with the ten gallon per minute flow control or orifice 33 and the shut-off valve in the branch equipped with the three gallon per minute flow control or orifice 35 are opened, thereby permitting an additional flow to the delivery pipe 13 of thirteen gallons of water. In this manner the volume of fifty-eight and one-half gallons of water to six and one-half bags of cement per minute and the water-cement ratio of nine gallons to one bag is attained.

It is believed my invention, its mode of operation and its many inherent advantages will be understood and appreciated from the foregoing without further description, and it should also be apparent that various modifications in the structure disclosed for illustrative purposes may be resorted to and that various other liquids and solids to be mixed may be used within the scope of my invention as defined in the following claims.

I claim:

1. In an apparatus for regulating and indicating the flow of a liquid, the combination of a header, a pair of risers spaced therefrom, a group of branch pipes connecting said header with one of said risers, said branch pipes being equipped with flow controls and some of said branch pipes being provided with shut-off valves, a volumetric flow meter connected with said riser to receive liquid therefrom, said meter including an indicator hand for indicating the volumetric flow of liquid therethrough, a pipe for delivering the liquid from said meter, the other of said risers being connected to said pipe, and branch pipes connecting said header with said other riser, said last named branch pipes being equipped with flow controls and shut-off valves.

2. In an apparatus for regulating the amount of water delivered to a gypsum cement mixer or the like and indicating the rate of delivery of gypsum cement to said mixer, the combination of a volumetric meter provided with an indicating hand for indicating the volumetric flow of liquid therethrough, a first riser, means including a header and a plurality of branch pipes communicating with said header and said meter through said first riser, flow controls in said branch pipes for determining the water flow to said meter, shut-off valves for shutting off certain of said branch pipes and means for supplementing the flow of water from said meter, including a second riser connected with the discharge from said meter, a plurality of branch pipes connecting said header with said second riser, each of said branch pipes being equipped with a flow control and a shut-off valve, and means for supplying water to said header.

3. An apparatus for regulating and indicating the flow of liquid, comprising a header, means for supplying liquid thereto, a riser, a plurality of parallel branch pipes connecting said header to said riser, flow control means in each branch pipe, means to adjust the rate of flow of liquid through said branch pipes to said riser, means communicating with said riser to indicate the volumetric flow of liquid issuing therefrom, delivery means extending from the discharge side of said indicating means, and adjustable means by-passing said indicating means from said header to said delivery means to supplement the liquid flow from said indicating means by an independent liquid flow sufficient to produce a total predetermined volumetric flow in a predetermined timed interval.

References Cited in the file of this patent

UNITED STATES PATENTS

| | | |
|---|---|---|
| 155,280 | Ball et al. | Sept. 22, 1874 |
| 1,985,397 | Bassett | Dec. 25, 1934 |
| 2,067,645 | Pinkerton | Jan. 12, 1937 |
| 2,229,903 | Schmohl et al. | Jan. 28, 1941 |
| 2,583,177 | Hoekstra | Jan. 22, 1952 |
| 2,808,180 | Calamai | Oct. 1, 1957 |

FOREIGN PATENTS

| | | |
|---|---|---|
| 932,131 | France | Nov. 17, 1947 |